May 10, 1955 V. C. FARRELL 2,707,928
SHIP'S HATCH AND COVER
Filed Jan. 9, 1951 3 Sheets-Sheet 1
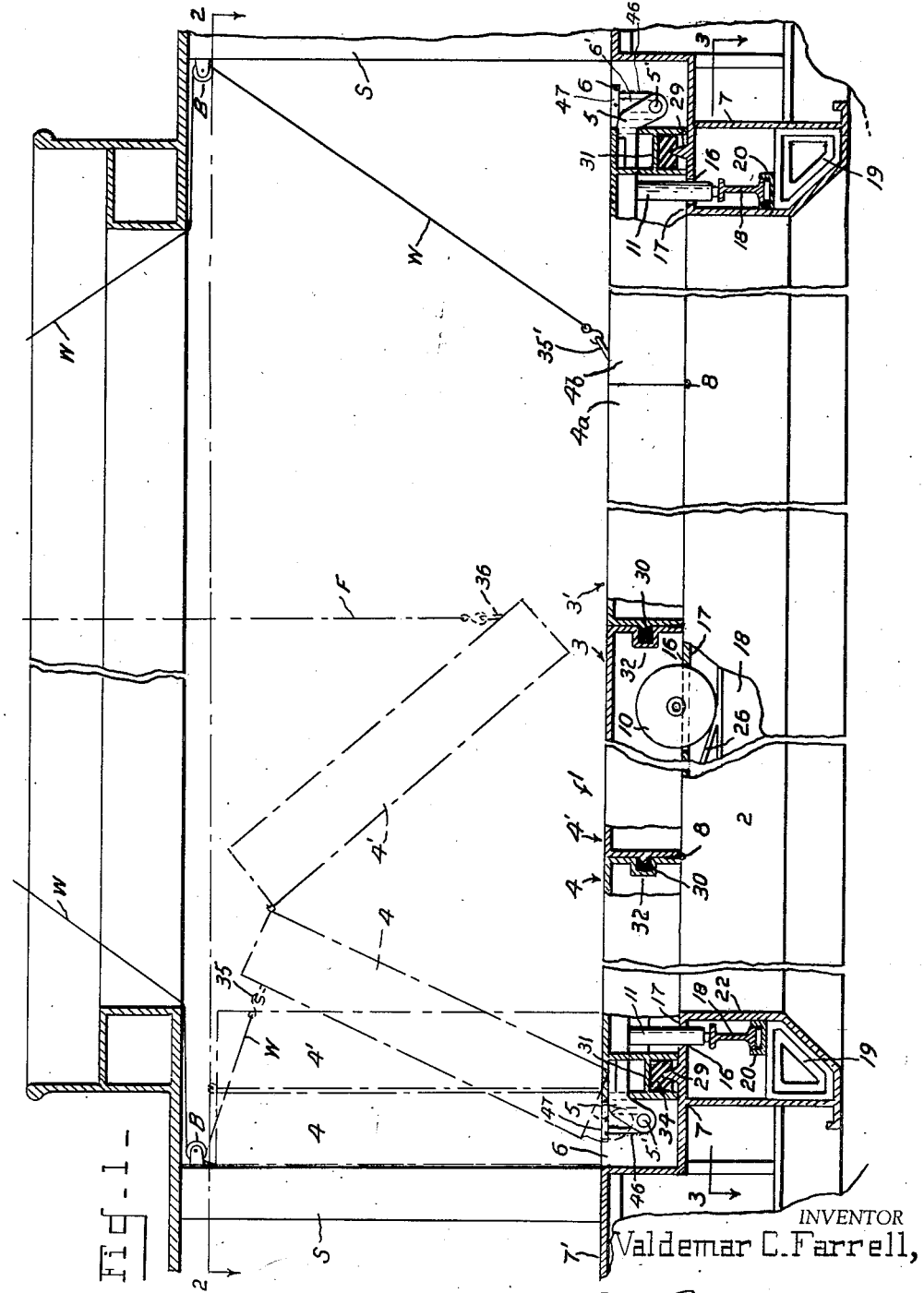
INVENTOR
Valdemar C. Farrell,
BY
ATTORNEY May 10, 1955  V. C. FARRELL  2,707,928
SHIP'S HATCH AND COVER
Filed Jan. 9, 1951  3 Sheets-Sheet 2
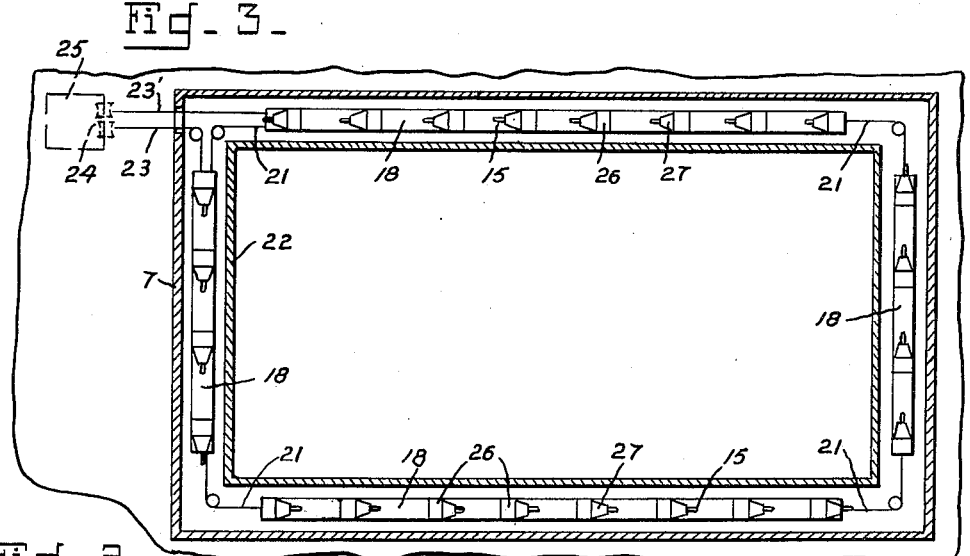
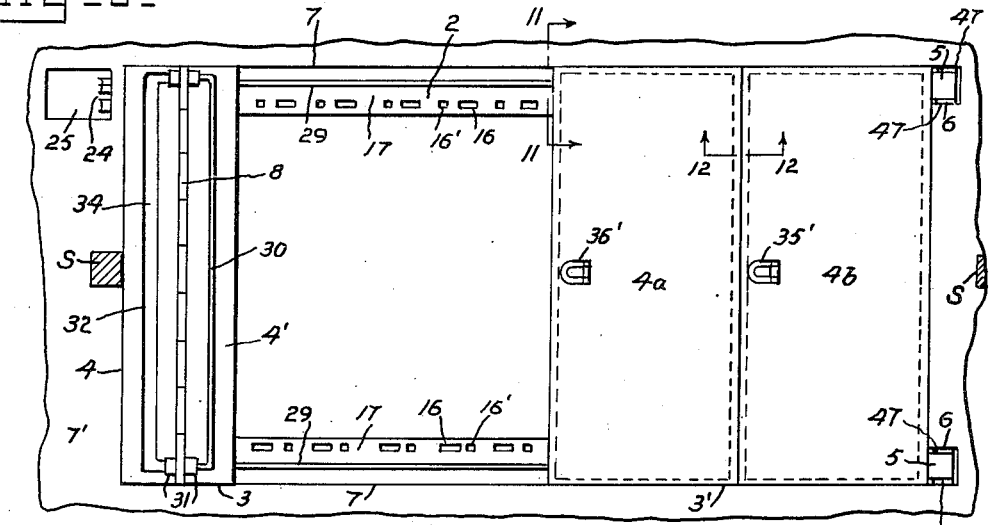
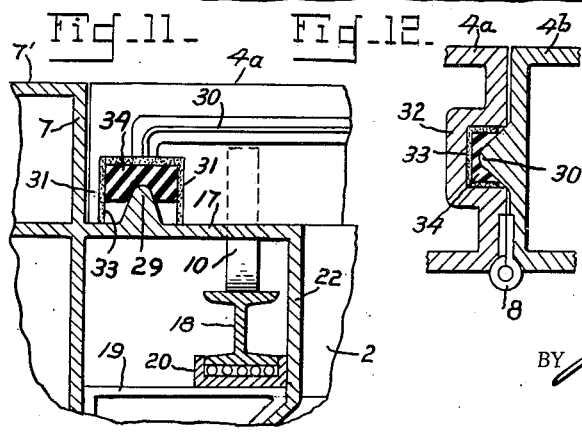
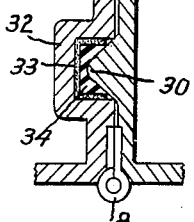
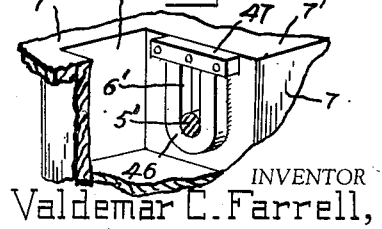
INVENTOR
Valdemar C. Farrell,
BY
ATTORNEY

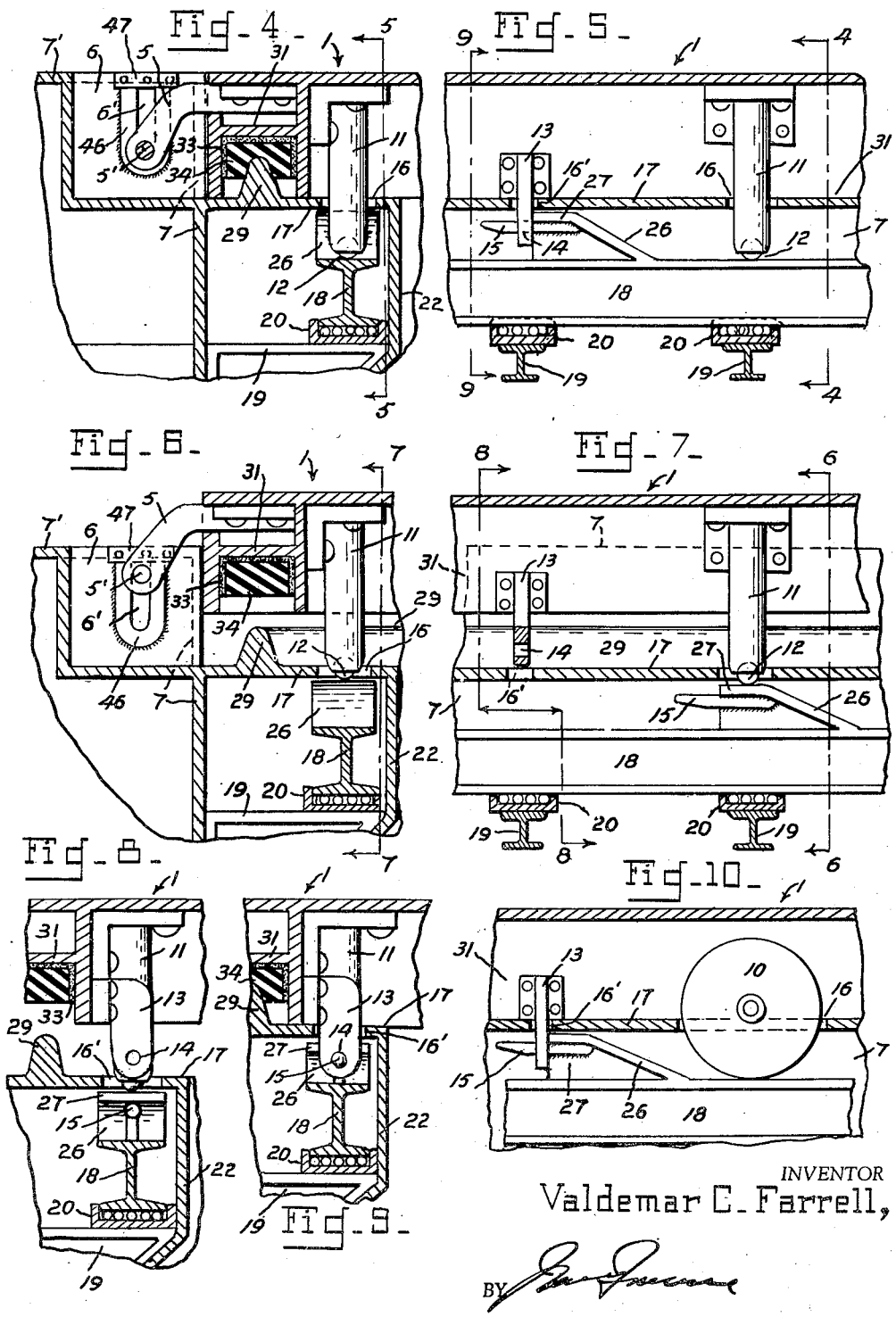

United States Patent Office 2,707,928
Patented May 10, 1955

2,707,928

SHIP'S HATCH AND COVER

Valdemar C. Farrell, West Englewood, N. J.

Application January 9, 1951, Serial No. 205,207

5 Claims. (Cl. 114—203).

This invention relates to hatch and cover constructions, and more particularly to the structure, sealing, and fastening or locking mechanism of a ship's hatch cover, especially to shelter deck hatch covers, although it may be applied to the hatch in any deck of a ship.

The conventional hatch covers which are predominately in use consist of multiple portable transverse beams that fit into sockets attached to the sides of the hatch coaming and a cover is then formed by laying hatch boards over the beams, which cover is then sealed by multiple cavas tarpaulins fitted over the hatch and around the coaming. The sealing is accomplished by fitting steel battens over the edges of the tarpaulins and inside steel bracket hooks. Wedges are then driven between the vertical sides of the hooks and the battens to force the latter against the canvas tarpaulins, which are in turn forced against the outer side of the hatch coaming.

A coaming, at least nine inches high, is required around the hatch opening to permit the use of such a cover. A substantial amount of time and labor is consumed in closing and opening this hatch, and it is not air-tight and is not water-tight when submerged. The handling of the portable hatch beams is a dangerous operation and those employed on it are frequently injured, even killed, while it is frequently an impossible task to find space to store the hatch beams when they are removed, and they sometimes have to be stored on the weather deck above or on the dock. The nine-inch high coaming makes it very difficult, expensive and dangerous to move cargo from the top of such hatch covers to the deck below for stowage in the wing and end recesses of the cargo hold while loading and in raising the cargo over such a coaming when discharging.

There are some air-tight and water-tight hatch covers in use on weather deck hatches, these covers being sealed by rubber gaskets. In these constructions, however, the gaskets are exposed on the inside so that they are open to flame flash from explosions or fire within the ship. These hatch covers are not adapted for shelter deck hatches, and moreover, they are cumbersome and difficult to handle even on the open weather deck.

Having in mind the defects of the prior art apparatus, it is an object of the present invention to provide a hatch cover that can be quickly and safely moved into position for closing and similarly into the stored position when the hatch is opened, and which will require a minimum amount of deck space when in the stored position.

It is another object of the invention to provide a hatch cover and unitary locking means therefor that may be actuated by a single operation to lock the cover around all sides thereof.

It is another object of the invention to provide a hatch cover that will be flush with the surrounding deck surfaces.

It is a further object of the invention to provide an air-tight, water-tight, fireproof hatch cover and to provide the gasket seal with shielding from flame on the inside as well as outside of the ship and produce a seal that will resist high air and water pressure.

It is still another object of the invention to provide a hatch cover with strong, quick opening and closing fastenings that will make it practical for use in every hatch opening on a ship so that the entire ship will be subdivided vertically by the inner decks as well as longitudinally by the bulkheads.

It is a still further object of the invention to provide a hatch cover that is adapted for two closed positions, one position permitting the passage of air and water, and the other position providing an air and water-tight sealing of the hatch opening.

It is yet another object of the invention to provide a hatch cover having simplicity of organization, economy of construction and efficiency in operation.

The novel features that are considered characteristic of the invention are set forth with particularity in the appended claims. The invention itself, however, both as to its organization and method of operation, together with additional objects and advantages thereof, will best be understood from the following description of a specific embodiment when read in connection with the accompanying drawings, wherein like reference characters indicate like parts throughout the several figures, and in which:

Figure 1 is a fragmentary transverse vertical cross sectional view through aligned hatch openings in a weather deck and a shelter or 'tween deck of a ship and illustrating a hatch cover in accordance with the present invention;

Figure 2 is a cross sectional view taken on line 2—2 of Figure 1 and showing in plan view one hatch cover section in open position and the other hatch cover section in closed position;

Figure 3 is a cross sectional view taken on line 3—3 of Figure 1 and showing in plan view the hatch cover support and latch mechanism;

Figure 4 is an enlarged fragmentary cross sectional view showing in detail the hatch hinge, seal and universal supporting mechanism as shown in the lower left corner of Figure 1 and corresponding to line 4—4 of Figure 5;

Figure 5 is a cross-sectional view taken on line 5—5 of Figure 4;

Figure 6 is a cross-sectional view similar to Figure 4 but showing the hatch cover lifted from its seal and corresponding to line 6—6 of Figure 7;

Figure 7 is a cross-sectional view taken on line 7—7 of Figure 6;

Figure 8 is a cross-sectional view taken on line 8—8 of Figure 7;

Figure 9 is a cross-sectional view taken on line 9—9 of Figure 5;

Figure 10 is a cross-sectional view corresponding to Figure 5 but showing a pivotal cover support used on the side of the hatch cover as illustrated in the lower central portion of Figure 1;

Figure 11 is an enlarged fragmentary cross-sectional view taken on line 11—11 of Figure 2;

Figure 12 is an enlarged fragmentary cross-sectional view taken on line 12—12 of Figure 2; and Figure 13 is an enlarged fragmentary view in perspective of the sealed hinge recess construction for the main cover hinges.

Referring now to the drawings, specifically to Figures 1 and 2, the present invention preferably comprises a hatch cover of non-flammable strong material, such as steel, formed in one or more parts, and each part may comprise one or two sections. Preferably not more than four sections will be employed to cover a hatch, and this arrangement is shown wherein the cover 1 for the hatch 2 is formed in two parts 3—3' which respectively have two sections 4—4' and 4a—4b.

The first or end sections 4 and 4b are hinged at the ends of the hatch by hinges 5 countersunk in recesses 6 in the hatch coaming 7. These countersunk hinges cause these sections to recess a distance equal to their thickness when either of them is opened to the vertical stored position when the hatch is open, as shown in dotted lines in Figure 1 and full lines in Figure 2. The second or inner sections are respectively hinged to the end sections at their under sides by hinges 8 so that when the respective end section is raised to the vertical position, the second section will fold downward against the first section in a vertical position, as also shown in Figures 1 and 2. In this position, the outside of the second or inner section 4' or 4a will be in alignment with the vertical alignment of the hatch end so that there will be no blockage of the hatch opening.

Multiple mobile supports comprising simple wheels 10 are journalled on the undersides near the edge of the sides of each section of the hatch cover, as shown in Figures 1, 10 and 11, and supports 11 with universally movable anti-friction members 12 inserted in their bottom ends are mounted on the undersides near the edge of the ends of the first or end sections 4 and 4b, as shown in Figures 1 and 4–8. Multiple locking elements, preferably in the form of lugs 13 with holes 14 therein for respectively receiving a keeper element such as a locking or fastening bolt 15 are also mounted on the undersides of the hatch cover sections so that they will be in alignment with the said wheels and supports.

When the hatch cover is closed, the said wheels 10 or supports 11 and lugs 13 will be in vertical alignment with slots or openings 16—16' respectively in a plate 17 forming a ledge or angle on which the hatch cover bears when closed. Beneath this plate and in parallel relation thereto, I beams 18 are movably mounted on brackets 19 supporting anti-friction bearings 20. An I beam 18 is fitted at each side and each end of the hatch and their ends are joined together by flexible members 21, such as cables or chains, so that they form a continuous belt-like unitary elevator and locking member around the hatch coaming 7. This continuous unitary member is preferably enclosed by an apron or auxiliary coaming 22 depending from the plate 17 and around the brackets 19 and thereby define the actual hatch opening.

A hauling wire 23 is attached to one end of one end I beam 18 and another such hauling wire 23' is attached to the adjacent end of one side I beam. Both wires 23—23' are led through a fair lead block 24 to a winch wire for moving the I beams back and forth. As the hauling wires 23—23' pass through an opening in the hatch coaming 7 beneath the deck 7', the block 24 is preferably positioned adjacent a sealable manhole 25. On the tops of the I beams 18, there are mounted a plurality of cam-like ramps 26 extending up from the tops of the I beams to flat platforms 27 which lie just beneath the ledge plates 17. There is one of these ramps for each said wheel 10 and support member 11. These ramps 26 may comprise T-sections secured on the I beams, and one of the locking bolts 15 is secured on the end of each such cam-like ramp. The bolts 15 are tapered to fit the hole 14 in each of the locking lugs 13, which are mounted on the undersides of each section of hatch cover, and there is a bolt provided for each lug, but more of these latches may be desired than supports and ramps so that the pins 15 may be mounted on the I beams 18 in any desired manner.

In operation, when the hatch cover is open, the platforms 27 of each cam-like ramp 26 will be positioned under the openings 16 in the ledge forming plate 17, and the wheels 10 or ball bearings 12 will be supported by said platforms. Then, by hauling upon the wire 23', the I beams 18 are moved so that the ramps 26 are moved under said wheels and supports so that the hatch cover 1 is lowered to closed position, wherein said wheels and support members will overlie or bear on the top flanges of the I beams 18. When the hatch cover is in this position, it is sealed, as will be described later, whereas when supported by the ramps 26, it is sufficiently open to allow water that may enter an upper compartment to pass through to the lower compartments. To accommodate the vertical movement of the hatch cover, the pins 5' of the hinges are seated and movable in elongated bearing channels 6' in the side walls of the recesses 6. The bearing channels 6' are closed to prevent leakage therethrough to the lower compartment and, as best shown in Figures 4, 6 and 13, may comprise U-shaped plates 46 welded to the inner sides of the recesses, so that the hinge pins 5' may be dropped into their channels or slots which may then be closed by a bar 47 removably secured to said recess sides over the tops of the plates 46.

The hatch cover seal comprises a beveled rib 29 on the ledge 17 that runs continuously around the hatch coaming 7 and spaced inwardly thereof in parallel relation thereto. A similar rib 30 is mounted on corresponding inner edges of the hatch cover sections 4', 4a and 4b, for example, where they abut the adjacent edges of sections 4, 4' and 4a respectively. These ribs 30 extend substantially the entire width of the hatch cover sections, and they are turned down at the sides to the underside seal of the hatch cover, as best shown in Figures 11 and 12.

On the undersides of the hatch cover sections at the side edges and end edges adjacent the hatch coaming 7, there is an inverted channel 31 that is continuous around the hatch edges of the hatch cover sections and in parallel relation to the hatch coaming. A similar channel 32 is provided in the inner abutting edges of the hatch cover sections 4, 4' and 4a, for example, in the opposite edges to those having the ribs 30. These channels 32 extend substantially the entire width of the hatch cover sections and down at their sides to the seal on the underside of the hatch cover. The insides of the said channels 31 and 32 are preferably lined with a fire resistant insulation 33, such as asbestos fibre, and a compressible gasket member 34, such as rubber, is then fitted into the channels.

The inverted channels 31 are adapted to overlie and cooperate with the ribs 29 and the edge channels 32 are adapted to coincide and cooperate with the edge ribs 30 respectively, to form an air and water tight seal. Moreover, the sides of the channels straddle the respective ribs and their edges bear directly on the respective cooperative member, whereby to obtain a rigid support and to completely enclose the compressible sealing member to protect it against a flame flash or the like. Thus, when the hatch covers are in closed position, the flanges of the inverted channel 31 will bear on the ledge 17 and the edges of the channels 32 on the edges of the hatch cover sections where they abut will bear firmly against the bases of the ribs 30 so that the steel rib or seat member and steel channel will form an interlocking joint. Furthermore, the ribs 29 and 30 will engage and compress the respective gaskets 34 to form an air and water tight seal.

As previously stated, when sealing of the hatch cover is desired, the hauling wire 23' is attached to the cargo winch fall on the ship, and the belt-like I beams 18, supporting the hatch cover, will be moved in the direction that will cause the said wheels 10 and support member 11—12 under the hatch cover to roll down the said cam-like ramps 26, the said wheels, support members and locking lugs lowering through their respective slots 16—16' in the ledge plate 17 and inverted channels 31 covering the ribs 29 and bearing on said ledge 17. When in this position, the sides of the channels 31 and its insulation member 33 are tightly seated on the plate 17 forming the hatch cover supporting ledge, and the gasket 34 is firmly bearing on the ribs 29. When the cover is in this position, the locking bolts 15 are in alignment with the holes 14 in the said locking lugs 13, and continued movement of the wire 23' and the belt-like I beams 18 will cause all the said locking bolts 15 to respectively enter all the said locking lugs 13 simultaneously and firmly lock down the entire hatch cover. In opening the hatch, the movement of the said belt-like I beams 18 is reversed by hauling on the wire 23, this reverse movement withdrawing the bolts 15 from the lugs 13 for unlocking the cover, and then moving the ramps 26 under the wheels and supports for lifting the hatch cover off the gasket sealing rib 29 and the supporting ledge 17.

In opening the hatch, a hauling wire W is attached to a ring 35—35' preferably recessed in the inner center of the top of the hinged hatch cover section 4—4b. This wire W is led to a tackle block B mounted on the center line stanchion S of the ship and slightly above the height of the hatch cover section when it is in the vertical stored position. This wire is then attached to the cargo winch fall and the cargo winch is used to haul on the wire for hoisting the first section 4—4b of the hatch cover to the vertical stored position, and it tows the second section 4'—4a hinged to it until it too reaches the vertical stored position by folding downward on the connecting hinges 8, as shown in dotted lines in Figure 1. In lowering the hatch cover to closing position, a winch cargo fall F is attached to a ring 36—36' on the second or inner section 4'—4a of hatch cover at its center line and free end. This section is then hoisted, as shown in Figure 1, until it is near a horizontal position with the cargo fall leading away from its end of the hatch. The other said wire W, attached to the first section 4—4b, is then slacked off slowly until the two sections are jointed or co-planar, and then both wires W and F are slacked off simultaneously until the two sections 4—4' or 4a—4b are resting on their said wheels 10 and support members 11—12 in closing position. The other of the two cover parts 3—3' are similarly handled except that in closing the last of the two parts, the inner section should be lowered slightly to break the sections at their hinged joint to permit the inner section to interlock with the section it abuts as the last of the two parts is flattened out on its said wheels and supports.

The subdivision of a ship by air-water-tight decks as well as bulkheads will make a cargo ship practically invulnerable to sinking by torpedoes or mines when sailing without cargo, and it will require at least twice as many torpedoes to sink such a ship when fully loaded. It will also permit extension of the distances between bulkheads so that some bulkheads can be eliminated and reduce construction costs. Such subdivision will also reduce the area of cargo damage through leakage by two-thirds so that marine risk, cargo and hull insurance cost should be reduced thereby at least 50%.

Although certain specific embodiments of the invention have been shown and described, it is obvious that many modifications thereof are possible. The invention, therefore, is not to be restricted except insofar as necessitated by the prior art and by the spirit of the appended claims.

What I claim is:

1. A hatch and cover construction, comprising a ship's deck, a hatch coaming in said deck and defining a hatch opening therethrough, the top of said coaming being substantially flush with said deck, a ledge extending inwardly around said coaming and spaced below the top thereof, a hatch cover fitted in said hatch coaming and having down-turned edges resting on said ledge, said edges being equal in height to the distance between said ledge and the coaming top to position the top surface of said cover substantially flush with said deck, and locking means between the inside of said cover and said ledge for releasably securing said cover in position, said locking means including an endless member movably mounted around said coaming, and two control wires connected to said member respectively for moving said member in opposite directions.

2. A hatch and covering construction comprising a hatch coaming defining a rectangular hatch opening, a ledge on at least two opposite sides of said hatch coaming and having spaced openings therein, a hatch cover seat around said coaming, a hatch cover for removable mounting on said seat and closing said hatch opening, a plurality of mobile supports spaced on said hatch cover and corresponding to the openings in said ledge, said supports resting on said ledge for movement of said hatch cover to and from closed position, said supports passing down through said openings to lower said cover on said seat, a unitary elevator means along said hatch coaming beneath said ledge and engageable with said mobile supports when the latter extend through said openings for simultaneously lifting or lowering said supports and unseating or seating said cover preparatory to removing or closing said cover.

3. A hatch and cover construction comprising a hatch coaming defining a rectangular hatch opening, a ledge extending around said coaming and having spaced openings therein, a hatch cover fitting said hatch coaming and having down-turned edge flanges resting on said ledge when said cover is in closed position, apertured lugs fixed to said cover and extending below said cover flanges for passage through said ledge openings when said cover is in closed position, and unitary locking means including a belt-like member mounted beneath said ledge and carrying a plurality of pins for respective insertion in the apertures in said lugs to lock said cover in closed position.

4. A hatch and cover construction as defined in claim 3 wherein said cover is provided with a plurality of depending mobile supports, said ledge having a second series of spaced openings for the passage of said supports, and said belt-like member including a plurality of space ramp-like runways for supporting said supports and moving said cover vertically to lift said cover from and seat it on said ledge.

5. A hatch and cover construction as defined in claim 4 wherein said cover comprises transverse sections, and hinges between the ends of said sections and the ends of said coaming, said hinges including hinge members secured to said cover sections and extending into sealed recesses in the hatch coaming and having closed channels in the sides thereof, said hinge members having hinge pins journaled in said closed channels to enable the vertical movement of the cover by said ramp-like runways.

References Cited in the file of this patent

UNITED STATES PATENTS

| | | |
|---|---|---|
| 1,103,958 | Griffin | July 21, 1914 |
| 1,607,767 | McGray | Nov. 23, 1926 |
| 1,679,526 | Isherwood et al. | Aug. 7, 1928 |
| 1,779,429 | Grieshaber | Oct. 28, 1930 |
| 1,912,255 | Clark | May 30, 1933 |
| 1,962,328 | Rohman et al. | June 12, 1934 |
| 2,004,722 | Hamm | June 11, 1935 |
| 2,257,776 | King | Oct. 7, 1941 |
| 2,264,426 | Young | Dec. 2, 1941 |
| 2,323,674 | Purkiss | July 6, 1943 |
| 2,327,580 | Carney | Aug. 24, 1943 |
| 2,484,286 | Groppell | Oct. 11, 1949 |
| 2,492,507 | Tipton | Dec. 27, 1949 |
| 2,494,247 | Kinish | Jan. 10, 1950 |
| 2,495,412 | Gouge | Jan. 24, 1950 |
| 2,511,267 | Jacob | June 13, 1950 |
| 2,511,268 | Schiff | June 13, 1950 |
| 2,614,856 | Beyer et al. | Oct. 21, 1952 |

FOREIGN PATENTS

| | | |
|---|---|---|
| 281,639 | Italy | Jan. 19, 1931 |
| 345,429 | Great Britain | Mar. 26, 1931 |
| 409,418 | Great Britain | May 3, 1934 |
| 432,925 | Great Britain | Aug. 6, 1935 |
| 451,629 | Great Britain | Aug. 10, 1936 |
| 463,404 | Great Britain | Mar. 30, 1937 |
| 523,560 | Great Britain | July 17, 1940 |
| 607,163 | Great Britain | Aug. 26, 1948 |
| 652,743 | Germany | June 16, 1936 |